Sept. 9, 1924.  
W. H. KOBBÉ  
1,508,144  
SULPHUR CONTAINING STRUCTURE AND METHOD OF MAKING SAME  
Filed Nov. 24, 1923
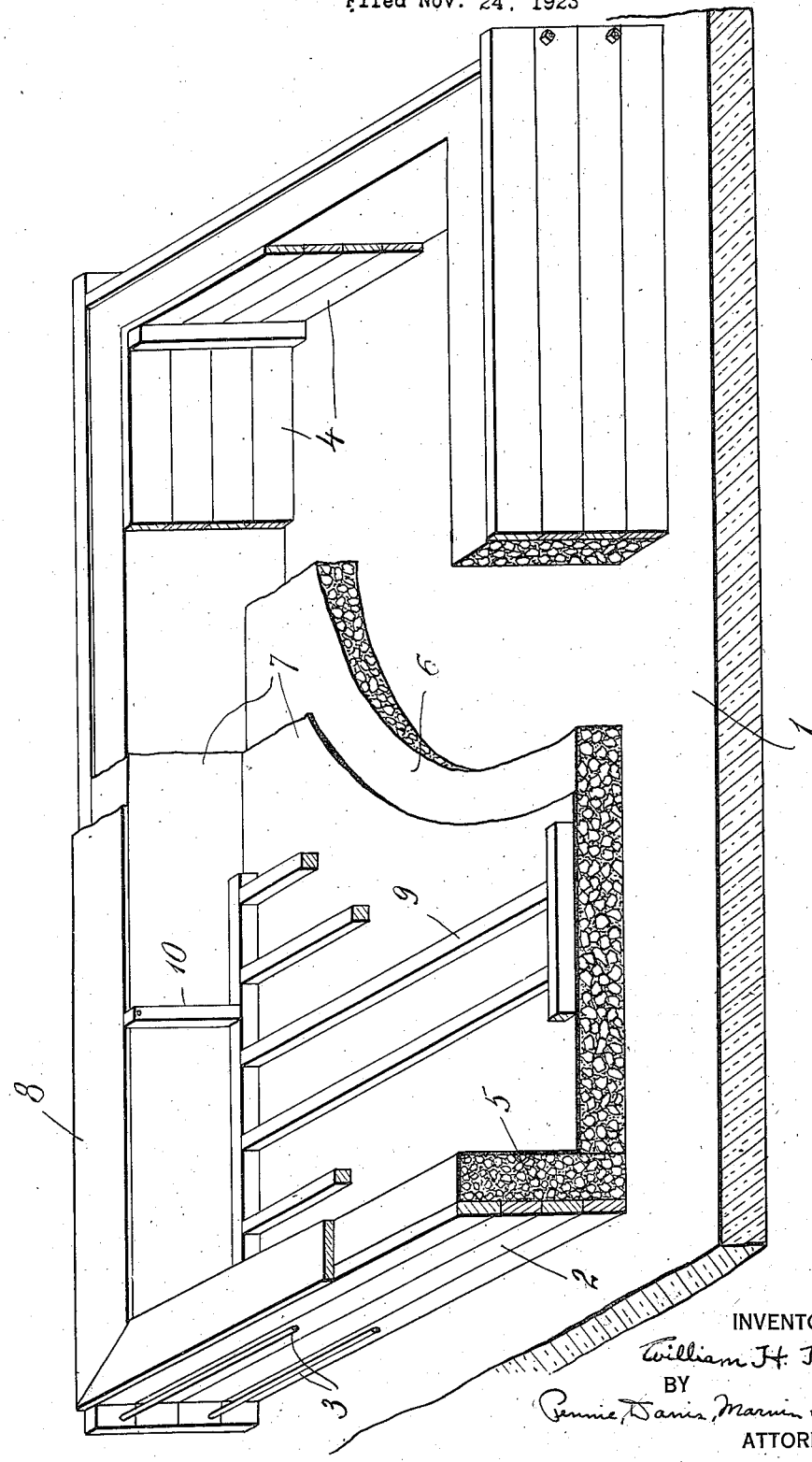
INVENTOR  
William H. Kobbé,  
BY  
Pennie, Davis, Marvin & Edmonds  
ATTORNEYS.

Patented Sept. 9, 1924.

1,508,144

UNITED STATES PATENT OFFICE.

WILLIAM HOFFMAN KOBBÉ, OF NEW YORK, N. Y., ASSIGNOR TO TEXAS GULF SULPHUR COMPANY, OF BAY CITY, TEXAS, A CORPORATION OF TEXAS.

SULPHUR-CONTAINING STRUCTURE AND METHOD OF MAKING SAME.

Application filed November 24, 1923. Serial No. 676,871.

*To all whom it may concern:*

Be it known that I, WILLIAM H. KOBBÉ, a citizen of the United States, residing at New York city, in the county of New York, State of New York, have invented certain new and useful Improvements in Sulphur-Containing Structures and Methods of Making Same; and I do hereby declare the following to be a full, clear, and exact description of the invention, such as will enable others skilled in the art to which it appertains to make and use the same.

This invention relates to sulphur-containing structures and methods of making the same. The invention has for its principal object the provision of an improved method of making structures composed at least in part of an intimate mixture of sulphur and finely divided carbonaceous material. More particularly, the invention aims to provide an improved method of making tanks or receptacles for corrosive liquors composed in whole or in part of a mixture of sulphur and finely divided carbonaceous material. Further objects of the invention will be discussed in the course of the following description.

In my copending patent applications, Serial No. 659,108, filed August 24, 1923 and Serial No. 662,356 filed September 12, 1923, I have described certain applications of a sulphur compound composed for the most part of an intimate mixture of sulphur and finely divided carbonaceous material. Various forms of carbonaceous material are available such, for example, as finely divided coke, anthracite coal, charcoal, carbon black, etc. Such a sulphur compound effectively resists the action of acids, alkalies, and many other corrosive liquors, and on this account such sulphur compounds are especially useful in the manufacture of tanks, receptacles, or the like, for containing corrosive liquors.

At the present time, wooden tanks are extensively used in many industries for holding corrosive liquors. Thus, wooden tanks are used for the storage of acids, alkalies and other corrosive liquors and also for containing such corrosive liquors in the course of some treatment process. For example, in metal-pickling it is customary to dip the metal into an acid solution, and the pickling solution is generally contained in a wooden tank. Considerable annoyance is caused by the leaking of such wooden tanks and where tie-rods are employed to hold the tank together, much difficulty is experienced from the breaking of these tie-rods due to the corrosive action of the liquors thereon.

I have heretofore proposed the use of compounds of sulphur and finely divided carbonaceous material for making tanks, receptacles and the like for corrosive liquors. Such sulphur compounds are prepared by melting an appropriate quantity of sulphur and intimately incorporating in the molten sulphur an appropriate quantity of the finely divided carbonaceous material. The resulting mixture is fluid and can be easily poured at temperatures slightly above the melting temperature of sulphur. Tanks or receptacles of small dimensions and similar objects and structures can be readily cast of such a sulphur compound. I have now found however that considerable difficulty is encountered in casting large masses of such a sulphur compound, due to internal stresses set up during solidification which result in cracks in the final structure.

In the course of my experiments and investigations, I have found that it is very difficult and substantially impossible under practical plant conditions to cast large masses of the aforementioned sulphur compounds without the development of objectionable cracking in the mass during or after solidification. This cracking appears to be brought about by strains set up within the mass when certain portions thereof cool and solidify in advance of other portions. The sulphur compounds contract on cooling and solidifying and where the cooling and solidification are non-uniform throughout the mass, cracks almost inevitably result.

I have discovered that structures of large size can be satisfactorily made, in whole or in part, of the aforementioned sulphur compounds, by introducing material into an appropriate form or mold and then filling the voids or spaces between the individual lumps of the aggregate material with the sulphur compound in a molten condition. The sulphur compound is then allowed to solidify in situ in the voids within the mass of aggregate material and there results a monolithic structure of the desired size and configuration.

Any suitable aggregate material may be employed in carrying out the present invention. By aggregate material I mean material in the form of lumps, generally irregular is size and configuration. In general, the individual lumps may range in size from about one to about three inches, although it will of course be understood that different sized aggregate material may be employed to meet the requirements of any particular structure in hand. The aggregate material may be composed of the sulphur compound itself, in which case the structure when completed is in effect composed throughout of a homogeneous mixture of sulphur and finely divided carbonaceous material. The aggregate material may consist of crushed trap rock, silicious rock, gravel, coke, scrap metal, and the like.

In the single figure of the accompanying drawing, I have diagrammatically represented the making of a metal-pickling tank in accordance with the principles of the present invention.

Referring to the drawing, the tank is made on a concrete floor or foundation 1. A rectangular enclosure 2 is first built upon the foundation 1. This enclosure may conveniently be made of two inch wooden planks and may be held together by tie-rods 3. I prefer, in some cases, to build the enclosure 2 as a permanent outer covering or wall for the finished structure.

Within the enclosure 2 and appropriately spaced therefrom is erected a temporary rectangular structure 4. The structure 4 may conveniently be made of one inch boards. The enclosures 2 and 4 constitute a form or mold and the spaces between these enclosures is filled with the sulphur-containing material in accordance with the principles of the present invention. For the purposes of explanation, I have illustrated in the drawing a tank whose inside dimensions are approximately 12 feet long, 4½ feet wide and 1½ feet deep. The walls and bottom of this tank are about 6 inches thick.

In accordance with my present invention, the spaces between the enclosures 2 and 4 are first filled with aggregate material. In a tank of the dimensions mentioned this aggregate material may conveniently be in the form of lumps of from 1 to 3 inches in size. The lumps of aggregate material will ordinarily be of irregular configuration and there will exist within the mass of aggregate material numerous spaces or voids. The aggregate material may consist of crushed rock, gravel, or other appropriate material. The aggregate material need not necessarily be inert with respect to the liquors used in the tank, since, as hereinafter explained, the inside or exposed surfaces of the tank are preferably covered with a thin layer of the corrosion-resisting sulphur compound. Where it is desired to build the entire tank of the corrosion-resisting sulphur compound, the aggregate material may consist of lumps of the compound itself. Thus, the sulphur compound may be solidified in large blocks or cakes and subsequently crushed, and screened if necessary, to provide aggregate material of appropriate size.

The voids or spaces within the mass of aggregate material (confined between the enclosures 2 and 4) are next filled with the corrosion-resisting sulphur compound in a molten condition. To this end, an appropriate molten mixture of sulphur and finely divided carbonaceous material is made and is poured upon the top of the mass of aggregate material. Preferably, the pouring of the molten sulphur compound takes place simultaneously at several points. The idea is to insure the penetration of the molten compound throughout the entire mass of the aggregate material. In a tank of the dimensions hereinbefore mentioned, satisfactory results have been secured by simultaneously pouring the molten sulphur compound upon the aggregate material near the center of the two ends and two sides of the tank. The pouring may be done by hand with buckets or in any other convenient manner. The temperature of the molten sulphur compound should be slightly above the melting temperature of the sulphur, but should not be so high that the sulphur becomes viscous. In other words, the sulphur compound at the time of pouring should be a freely-flowing liquid.

The sulphur compound is permitted to solidify in situ within the mass of the aggregate material. There results a monolithic structure in which the individual lumps of the aggregate material are firmly bonded or cemented together. By a monolithic structure, I mean one in which the component parts thereof are firmly bonded together in the form of a unitary and substantially homogeneous mass. Where the aggregate material is composed of the corrosion-resisting sulphur compound, the monolithic structure will be throughout a homogeneous mixture of sulphur and finely divided carbonaceous material.

When the four walls of the tank have been constructed as described, the inner enclosure 4 is removed. An appropriate depth of aggregate material is then spread upon the foundation 1 and within the enclosing walls 5 of the tank. Thereupon, the corrosion-resisting sulphur compound in a molten condition is poured upon this aggregate material, preferably simultaneously at a plurality of points, and upon filling the voids in the aggregate material and solidifying in situ forms the bottom 6 of the tank.

The inner or exposed surfaces of the tank are next preferably coated or covered with a thin layer 7 of the corrosion-resisting sulphur compound. In order to avoid cracking of this surfacing layer I have found that it is necessary to apply the coating in thin films permitting partial solidification between successive applications of the films. This can be conveniently accomplished by applying the molten sulphur compound to the exposed surfaces with a brush or broom. In other words, the molten sulphur compound is painted or swashed on to the exposed surfaces in relatively thin films until a coating or layer of the desired thickness has been built up.

The tops of the walls 5 of the tank illustrated in the drawing are covered with planks 8. If desired, a wooden frame 9 may be laid upon the bottom 6 of the tank and may be anchored in position (so that it will not float in the liquor in the tank) by wooden blocks 10 secured to the top wall planks 8.

The sulphur compound which I ordinarily prefer to employ is composed of about 60% sulphur and 40% of finely divided coke. Preferably, the coke is through 200 mesh. It will, of course, be understood that other finely divided carbonaceous materials may be employed and that the relative proportions of sulphur and carbonaceous material may be varied without departing from the spirit of the present invention.

I have found the ordinary asphalt melter suitable for the preparation of the sulphur compound. A five barrel asphalt melter on wheels is a convenient size and type to employ. I prefer to use a Hauck burner for heating the melter, since it is susceptible of convenient control. The heating of the sulphur compound must be carefully controlled after the sulphur becomes melted, in order to avoid raising the temperature of the molten mass to the temperature at which sulphur becomes viscous. I have found that satisfactory results are secured by maintaining the molten mass in the melter at a temperature of from 125° C. to 150° C.

In preparing the sulphur compound, the carbonaceous material, such as coke, is first ground to a relatively fine powder. The sulphur is then melted and the temperature raised to slightly above the melting point, say to about 125–150° C. The finely divided carbonaceous material is then poured into the molten sulphur and intimately mixed. I prefer to add the carbonaceous material in small instalments, say a shovelfull at a time, and to thoroughly agitate or stir the molten mass, so as to insure complete and uniform incorporation of the finely divided carbonaceous material.

The aggregate material is placed in the forms at atmospheric temperature. The mass of aggregate material is thus relatively cold compared with the molten sulphur compound subsequently poured thereon. I believe that this condition of the aggregate material, that is, being relatively cold, and its cooling capacity in consequence thereof contributes very largely to the making of these large tanks or receptacles without cracking. As a result of this large bulk of relatively cold material, the molten sulphur compound cools and solidifies more uniformly throughout the entire mass and there is consequently less pronounced strains within the mass as a result of the contraction of the sulphur compound during solidification.

Outlets and other appropriate connections may be incorporated in the walls of the tank during its formation. Thus, hollow tubes of cardboard or the like, may be embedded in the aggregate material and may form appropriate holes or outlets through the wall of the tank when completed. When the tank is composed throughout of the corrosion-resisting sulphur compound, holes may be made or bored in the walls by means of a hot pipe or poker. If desired, iron pipes of relatively large diameter may be filled with the sulphur compound and embedded in the mass of aggregate material, and after the tank is completed a hole of smaller diameter may be bored or reamed through the sulphur compound within the iron pipe.

It will of course be understood that the enclosing forms for the aggregate material may be constructed of other appropriate material than planks and boards. For example, in the construction of circular tanks tin-coated sheet-metal will be found quite satisfactory. When the structure has solidified the sheet-metal forms and their supporting appurtenances may be removed. It will also be understood that the permanent retention of the outer enclosing wall 2 (in the accompanying drawing) is optional, and this wall, may, if desired, be removed leaving the monolithic structure standing alone. If desired, the outer wall of the structure may be banked up with dirt, clay, or other appropriate material. Reinforcing agencies may also, if desired, be included in the aggregate material and thus incorporated in the completed structure.

A monolithic structure made in accordance with the present invention can be readily repaired, in case of breaks or cracks therein, in accordance with the principles of the invention for making the completed receptacle. Thus, the broken or cracked portion of the structure may be cut out and an appropriate enclosure or form erected about the cut-out portion. This temporary form is then filled with aggregate material and the voids therein filled with the compound of sulphur and finely divided carbonaceous material in a molten condition. Upon solidification of the sulphur compound, the repaired portion will be found monolithically united with the remainder of the structure.

I claim:—

1. The method of making structures composed at least in part of a compound of intimately mixed sulphur and finely divided carbonaceous material which comprises appropriately confining a mass of aggregate material, filling the voids throughout the mass of aggregate material with the compound of intimately mixed sulphur and finely divided carbonaceous material in a molten condition, and permitting said compound to solidify in situ whereby the aggregate material and sulphur compound are bonded together to form a monolithic structure.

2. The method of making structures composed at least in part of a compound of intimately mixed sulphur and finely divided coke which comprises appropriately confining a mass of aggregate material, filling the voids throughout the mass of aggregate material with the compound of intimately mixed sulphur and coke in a molten condition, and permitting said compound to solidify in situ whereby the aggregate material and sulphur compound are bonded together to form a monolithic structure.

3. The method of making receptacles for corrosive liquors and the like which comprises appropriately confining a mass of aggregate material, filling the voids throughout the mass of aggregate material with a molten compound of intimately mixed sulphur and finely divided carbonaceous material, and permitting the sulphur compound to solidify in situ in the mass of aggregate material whereby the aggregate material and sulphur compound are bonded together and form a monolithic structure.

4. The method of making receptacles for corrosive liquors and the like which comprises appropriately confining a mass of aggregate material, filling the voids throughout the mass of aggregate material with a molten compound of intimately mixed sulphur and finely divided coke, and permitting the sulphur compound to solidify in situ in the mass of aggregate material whereby the aggregate material and sulphur compound are bonded together and form a monolithic structure.

5. The method of making structures composed at least in part of a compound of intimately mixed sulphur and finely divided carbonaceous material which comprises introducing aggregate material at approximately atmospheric temperature into an appropriate form, filling the voids within the mass of the aggregate material with the compound of sulphur and finely divided carbonaceous material in a molten condition, and permitting said compound to solidfy in situ whereby the aggregate material and sulphur compound form a monolithic structure.

6. The method of making structures composed at least in part of a compound of intimately mixed sulphur and finely divided carbonaceous material which comprises introducing aggregate material at approximately atmospheric temperature into an appropriate form, filling the voids within the mass of the aggregate material with the compound of sulphur and finely divided carbonaceous material in a molten condition, permitting said compound to solidify in situ whereby the aggregate material and sulphur compound form a monolithic structure, and covering exposed surfaces of said structure with a relatively thin layer of said sulphur compound by the successive application to in molten condition and solidification on such surfaces of films of the sulphur compound.

7. The method of making structures composed at least in part of a compound of intimately mixed sulphur and finely divided carbonaceous material which comprises appropriately confining a mass of aggregate material, filling the voids throughout the mass of aggregate material with the compound of intimately mixed sulphur and finely divided carbonaceous material in a molten condition, permitting the sulphur compound to solidify in situ in the mass of aggregate material whereby the aggregate material and sulphur compound are bonded together and form a monolithic structure, and applying a thin layer of the sulphur compound to exposed surfaces of said structure by painting the compound in a molten condition upon such surfaces.

8. The method of making receptacles for corrosive liquors and the like which comprises appropriately confining a mass of aggregate material, filling the voids throughout the mass of aggregate material with a molten compound of intimately mixed sulphur and finely divided coke, permitting the sulphur compound to solidify in situ in the mass of aggregate material whereby the aggregate material and sulphur compound are bonded together and form a monolithic structure, and applying a thin layer of the sulphur compound to exposed surfaces of said structure by painting the compound in a molten condition upon such surfaces.

9. The method of making structures composed of a compound of intimately mixed sulphur and finely divided carbonaceous material which comprises appropriately confining a mass of aggregate material composed of suitably sized lumps of the sulphur compound at approximately atmospheric temperature, filling the voids throughout the mass of the aggregate material with the sulphur compound in a molten condition, and permitting such molten sulphur compound to solidify in situ in the mass of aggregate material whereby the aggregate and molten materials form a monolithic structure composed throughout of a substantially homogeneous mass of intimately mixed sulphur and carbonaceous material.

10. The method of making receptacles for corrosive liquors and the like which comprises appropriately confining a mass of aggregate material composed of a compound of intimately mixed sulphur and finely divided carbonaceous material at approximately atmospheric temperature, filling the voids throughout the mass of aggregate material with a molten compound of intimately mixed sulphur and finely divided carbonaceous material, and permitting such molten sulphur compound to solidify in situ in the mass of aggregate material whereby the aggregate and molten materials ultimately form a monolithic structure composed throughout of a substantially homogeneous mass of intimately mixed sulphur and carbonaceous material.

11. As a new article of manufacture, a structure composed at least in part of a compound of intimately mixed sulphur and finely divided carbonaceous material and comprising a mass of aggregate material with the individual lumps thereof united and bonded together by the compound of sulphur and carbonaceous material.

12. As a new article of manufacture, a structure composed at least in part of a compound of intimately mixed sulphur and finely divided carbonaceous material and comprising a mass of aggregate material with the spaces between the individual lumps thereof filled with and the lumps united and bonded together by the compound of sulphur and carbonaceous material.

13. As a new article of manufacture, a structure composed at least in part of a compound of intimately mixed sulphur and finely divided coke, and comprising a mass of aggregate material with the individual lumps thereof united and bonded together by the compound of sulphur and coke.

In testimony whereof I affix my signature.

WILLIAM HOFFMAN KOBBÉ.